No. 613,479. Patented Nov. 1, 1898.
W. SAMPSON.
SEAT FOR LOCOMOTIVE ENGINES.
(Application filed Apr. 5, 1898.)

(No Model.) 2 Sheets—Sheet 1.

WITNESSES
INVENTOR
William Sampson,
by Watton & Co.
Attorneys.

No. 613,479. Patented Nov. 1, 1898.
W. SAMPSON.
SEAT FOR LOCOMOTIVE ENGINES.
(Application filed Apr. 5, 1898.)
(No Model.) 2 Sheets—Sheet 2.
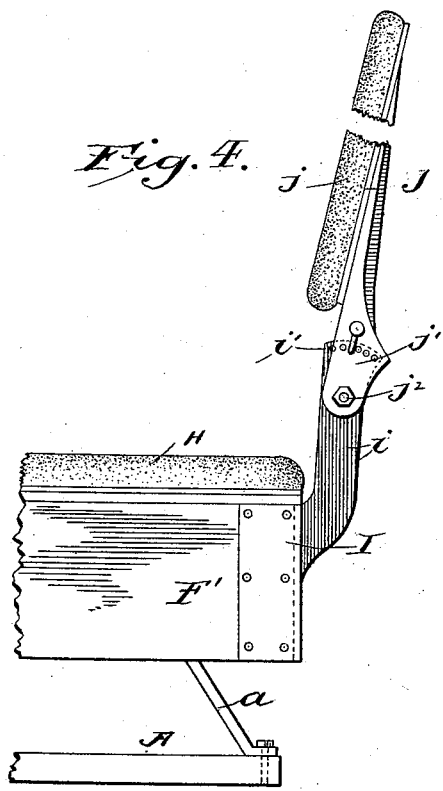
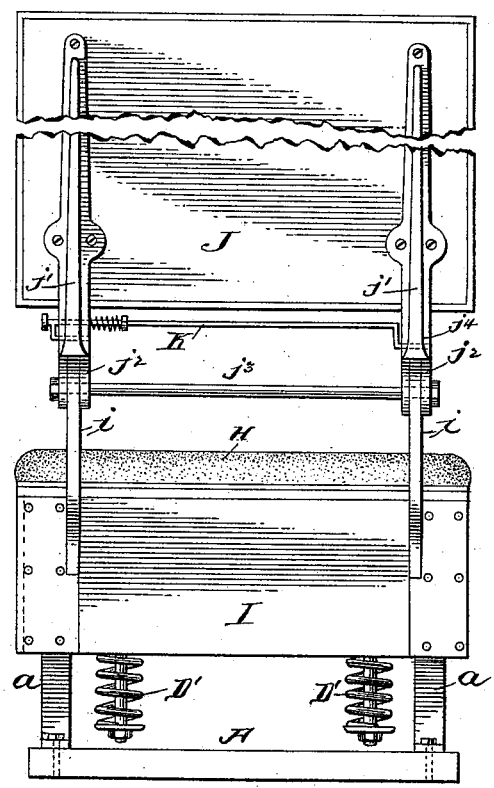
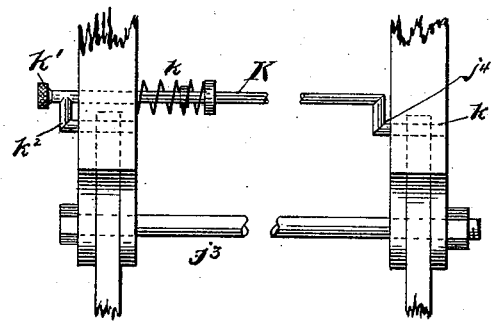
WITNESSES
INVENTOR
William Sampson,
by Watton & Co.
Attorneys.

UNITED STATES PATENT OFFICE.

WILLIAM SAMPSON, OF MASON CITY, IOWA.

SEAT FOR LOCOMOTIVE-ENGINES.

SPECIFICATION forming part of Letters Patent No. 613,479, dated November 1, 1898.

Application filed April 5, 1898. Serial No. 676,558. (No model.)

*To all whom it may concern:*

Be it known that I, WILLIAM SAMPSON, a citizen of the United States, residing at Mason City, in the county of Cerro Gordo and State of Iowa, have invented certain new and useful Improvements in Seats for Locomotive-Engines, Motor-Cars, &c.; and I do hereby declare the following to be a full, clear, and exact description of the invention, such as will enable others skilled in the art to which it appertains to make and use the same.

This invention relates to improvements in seats for locomotive-engines, motor-cars, and vehicles in general where jarring and motion are encountered.

An object of the invention is to provide such a seat which is simple and durable, inexpensive to construct, which is adjustable, and which will readily take up, by suitable spring-and-lever arrangement, any sudden shock or jar which a person sitting upon an ordinary seat would receive; and the invention embraces other and minor improvements, which will be more clearly pointed out in the specification and claims.

Reference is to be had to the accompanying drawings for a full and comprehensive understanding of the invention, in which—

Figure 1:
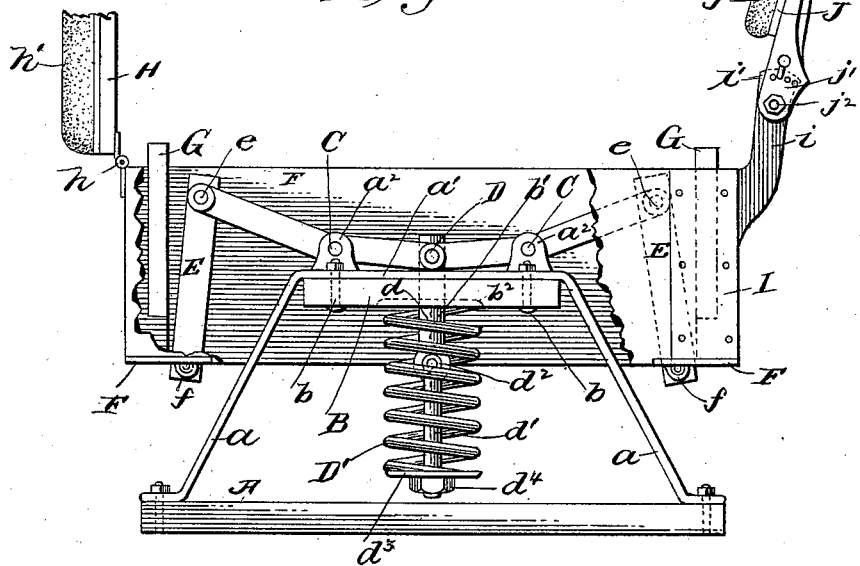
Figure 2:
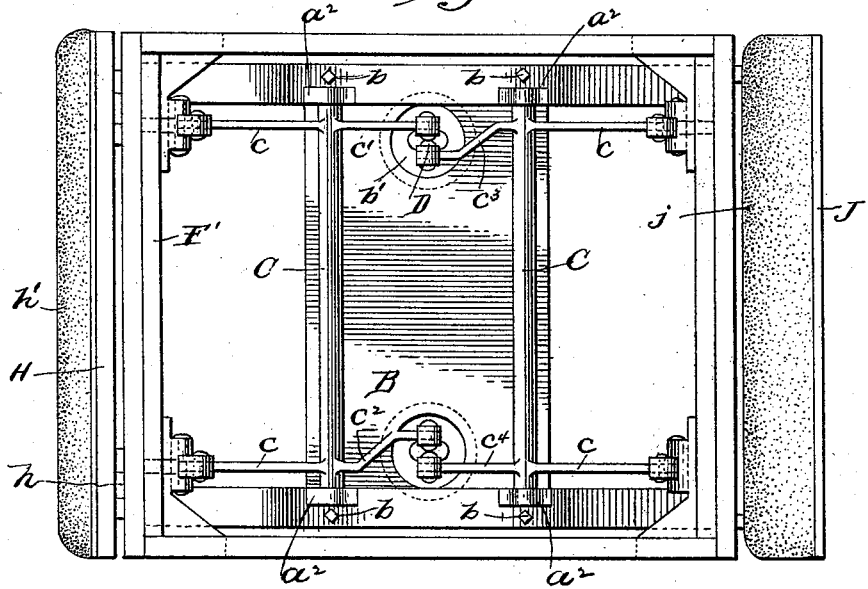

Figure 1 is a view of my improved seat in elevation, parts being broken away and the seat itself being swung upward upon its hinges to show the parts more clearly. Fig. 2 is a plan view of the same. Fig. 3 is an end view of the seat, illustrating the adjustable back of the seat; and Fig. 4 is a side view of a portion of said seat, showing the adjustable back. Fig. 5 is a detail of the locking device for securing the back of the seat in any desired position.

In the drawings, A refers to the rectangular base of the seat, suitably secured together and having upright standards $a$ bolted to its corners, slightly inclined inwardly, each pair thereof forming an inverted-U-shaped frame, as shown, the top being $a'$. These two U-shaped frames are secured together, preferably by a rectangular framework B, securely bolted to the under sides thereof at $b$, and upon the upper sides of these U-shaped frames, near the standards $a$, are provided, cast thereon or bolted thereto, journal-bearings $a^2$, as shown, in which are mounted lever-shafts C transverse of the seat, and these shafts, which are parallel to each other, have outward and corresponding arms $c$ cast or rigidly secured thereto, and also arms $c'$ $c^2$ $c^3$ $c^4$, extending inwardly, the arms $c^2$ and $c^3$ having inwardly-formed offsets thereon, so that these ends, which are apertured, may register with apertured ends $c'$ $c^4$ and have pivotal connections or bolts D, from which pivots are suspended bars $d$ $d$, having lower pivoted bars $d'$ $d'$, upon the lower ends of which are apertured plates $d^3$, held thereon by nuts $d^4$, screwed upon the threaded lower ends of bars $d'$ $d'$, as shown, between which plates and suitable hollowed-out seats $b^2$ are held spiral tension-springs D', the framework B being apertured below the pivotal connections of the arms $c'$ $c^2$ $c^3$ $c^4$, as shown, for the passage of the arms $d$ and to permit the pivotal ends of said arms to be depressed therein when the rods $d$ are forced downwardly.

To the outer ends of arms $c$ are pivoted the upper ends of depending rods E, of equal length, the lower ends of the latter being pivotally secured to eyes $f$ of plates F, securely bolted or otherwise secured to the lower bottom corners of a rectangular framework F', open at the top and bottom, as shown.

G are suitable projections attached to the framework F', near the ends thereof, to hold a hinged seat H in place on the top of framework F' when it lies on the top of the same. Said seat is hinged at the front end of the framework F' at $h$, which permits it to be swung into a vertical position, as shown, when it is desired to examine or to repair any of the underlying parts of the seat, and this seat H has an upholstered top $h'$ in any approved form.

I is a plate bolted or screwed to the rear end of the framework F', which has two upwardly-extending arms $i$ rigidly connected therewith, and the upper ends of these arms are slightly enlarged and apertured at $i'$, as shown.

J is an adjustable back of a seat having an upholstered front $j$ and depending arms $j'$, the lower ends of which are apertured and pivotally mounted on the upper ends of arms $i$ by means of a rod $j^3$, passing through arms $i$, slightly below apertures $i'$, and through arms $i$, said lower ends $j^2$ of arms $j'$ preferably being slotted and the upper ends of arms $i$ being pivoted therein by rod $j^3$, as aforesaid. K is a spring-latch for locking said back of the seat in any desired position, and this latch consists of a rod K, passing through apertures in arms $j'$ just above the upper ends of arms $i$ and having a spring $k$ thereon held in place between the left arm $j'$ and a suitable stop on said rod, as shown, to limit the outward play of said rod and to retain a lower depending rod $k^2$ and the outer depressed end $k^3$ in apertures which register in arms $j'$ and arms $i$, before referred to, said latch being operated by means of a suitable handle $k'$, as shown.

On account of the peculiar lever-and-spring arrangement of the device, and especially the arrangement of the lever-rods E, which allow end movement of the seat, a great deal of the jar and sudden wrenching encountered on ordinary seats is done away with, and this improved seat is found to take up such sudden jars and movements in general, so as to render riding thereon a matter of ease and comfort.

Suitable spring-bumpers of any well-known form may be used, if desired, to prevent excessive lateral thrusts of the seat.

Having thus described my invention, what I claim, and desire to secure by Letters Patent, is—

1. A seat for locomotive-engines, motor-cars and vehicles, comprising a base, standards thereon secured together at their tops, shafts mounted to revolve on said standards, lever-rods centrally mounted on said shafts having their inner ends pivoted together, pivoted rods depending from said pivotal connections, springs supported on said pivotal rods and bearing against the upper or tops of said standards, depending rods pivotally supported from their upper ends from the outer ends of said lever-rods, an open framework having plates on its under sides in which the lower ends of said depending rods are pivotally attached, a hinged seat on the top of said open framework, and an adjustable back on one end of said open framework, substantially as described and set forth.

2. The combination in a seat for locomotive-engines, motor-cars, &c., of a base, standards thereon supporting two transverse shafts, lever-rods mounted on said shafts having their inner ends pivotally connected in pairs, rods depending from said pivotal connections, spiral springs supported on said rods, their upper ends bearing against the upper parts of the standards, the outer ends of said lever-rods having depending rods E, pivotally attached thereto, an open framework pivotally supported on the lower ends of rods E, a hinged seat secured to the top of said open framework, an adjustable back secured to one end of said open framework, and a spring-latch for securing said back in any desired position, substantially as described and set forth.

In testimony whereof I affix my signature in presence of two witnesses.

WILLIAM SAMPSON.

Witnesses:
 H. O. SAMPSON,
 GARRETT STARR.